(12) United States Patent
Campos et al.

(10) Patent No.: US 8,777,264 B2
(45) Date of Patent: Jul. 15, 2014

(54) STEERING COLUMN ASSEMBLY FOR A MOTOR VEHICLE

(71) Applicant: GM Global Technology Operations LLC, Detroit, MI (US)

(72) Inventors: Demerson A. Campos, Sao Paulo (BR); Gino Ricardo Caso, Sao Paulo (BR); Peter J. Judis, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/645,731

(22) Filed: Oct. 5, 2012

(65) Prior Publication Data

US 2014/0097605 A1 Apr. 10, 2014

(51) Int. Cl.
 *B62D 1/18* (2006.01)
(52) U.S. Cl.
 USPC .......................................................... 280/775
(58) Field of Classification Search
 USPC ............................ 280/775, 779; 74/492, 493
 See application file for complete search history.

(56) References Cited

U.S. PATENT DOCUMENTS

| | | | |
|---|---|---|---|
| 5,090,730 A | 2/1992 | DuRocher et al. | |
| 6,655,715 B2* | 12/2003 | Anspaugh et al. | 280/777 |
| 7,077,027 B2* | 7/2006 | Krizan et al. | 74/493 |
| 8,382,156 B2* | 2/2013 | Akutsu et al. | 280/777 |
| 2007/0272049 A1* | 11/2007 | Eggers et al. | 74/493 |
| 2011/0030496 A1* | 2/2011 | Tokioka | 74/492 |
| 2012/0112443 A1* | 5/2012 | Arakawa et al. | 280/777 |
| 2012/0240711 A1* | 9/2012 | Minamigata et al. | 74/493 |
| 2012/0291585 A1* | 11/2012 | Minamigata et al. | 74/493 |

FOREIGN PATENT DOCUMENTS

KR 2005101372 A * 10/2005

* cited by examiner

*Primary Examiner* — Faye M. Fleming
(74) *Attorney, Agent, or Firm* — Quinn Law Group, PLLC

(57) ABSTRACT

A steering column assembly for a motor vehicle is provided. The steering column assembly may include a main steering column shaft; a first tubular member; a first attachment feature; and a second attachment feature. The first attachment feature and the second attachment feature may be formed of an injection moldable material such as nylon or polypropylene, having a load glass fiber component. The first and second attachment features are injection molded about the main steering column shaft. A method of constructing a steering column assembly for a motor vehicle is also provided, wherein the first attachment feature and the second attachment feature are injection molded and positioned about the main steering column shaft.

14 Claims, 3 Drawing Sheets

STEERING COLUMN ASSEMBLY FOR A MOTOR VEHICLE

TECHNICAL FIELD

The present invention relates to a steering column for a motor vehicle.

BACKGROUND

Conventional steering columns for motor vehicles include an elongated, axial steering column shaft having a first end and a second end. The steering column shaft is connected at the first end to a steering wheel and is connected to a tail or energy shaft at the second end. The tail or energy shaft is coupled to the steering linkage and gear assembly. The steering column shaft is encircled by a concentric transmission tube assembly and an outer supporting column or mast jacket.

Various brackets are mounted on the jacket to rigidly connect the steering column to the instrument panel structure at the attachment points. Conventional steering columns, brackets, and mast jackets are conventionally made of metallic materials and the brackets are typically attached to the jacket by welding or a similar metal working process.

SUMMARY

A steering column assembly for a motor vehicle is provided. The steering column assembly may include a main steering column shaft having a first end and a second end; a first tubular member, which may concentrically surround the main steering column shaft; a first attachment feature; and a second attachment feature. The main steering column shaft may be concentrically surrounded by the first tubular member proximate its first end.

The main steering column shaft may be coupled with the vehicle steering linkage and gear assembly and a steering column tail shaft at its first end by the first attachment feature. The first attachment feature may be formed of an injection moldable material, such as nylon or polypropylene, having a load glass fiber component. The first attachment feature may be injection molded about the first tubular member proximate the main steering column shaft first end.

The main steering column shaft may be connected to the instrument panel structure of a motor vehicle by a second attachment feature. The second attachment feature may be formed of an injection moldable material, such as nylon or polypropylene, having a load glass fiber component. The second attachment feature may be injection molded about the main steering column shaft and positioned intermediately between the main steering column shaft first end and the main steering column shaft second end.

A method of constructing a steering column assembly for a motor vehicle is also provided. The method comprises the steps of: fitting a first tubular member about a main steering column shaft having a main steering column shaft first end and a main steering column shaft second end and positioning the first tubular member between the main steering column shaft first end and the main steering column second end; positioning the main steering column shaft and first tubular member within a first mold with a mold cavity configured to define a first attachment feature, positioned at the main steering column shaft first end and positioning the main steering column shaft and first tubular member within a second mold with a mold cavity configured to define a second attachment feature, positioned intermediately between the main steering column shaft first end and the main steering column shaft second end; injecting a high-strength injection moldable material into the first mold and the second mold; and molding the high-strength injection moldable material to form the first attachment feature and second attachment feature about the main steering column shaft and first tubular member.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

The following description and Figures refer to example embodiments and are merely illustrative in nature and not intended to limit the invention, its application, or uses. Referring to the Figures, wherein like reference numbers correspond to like or similar components throughout the several views, a steering column assembly 100 for a motor vehicle is provided, and shown generally in FIG. 1 and FIG. 2.

Figure 1:
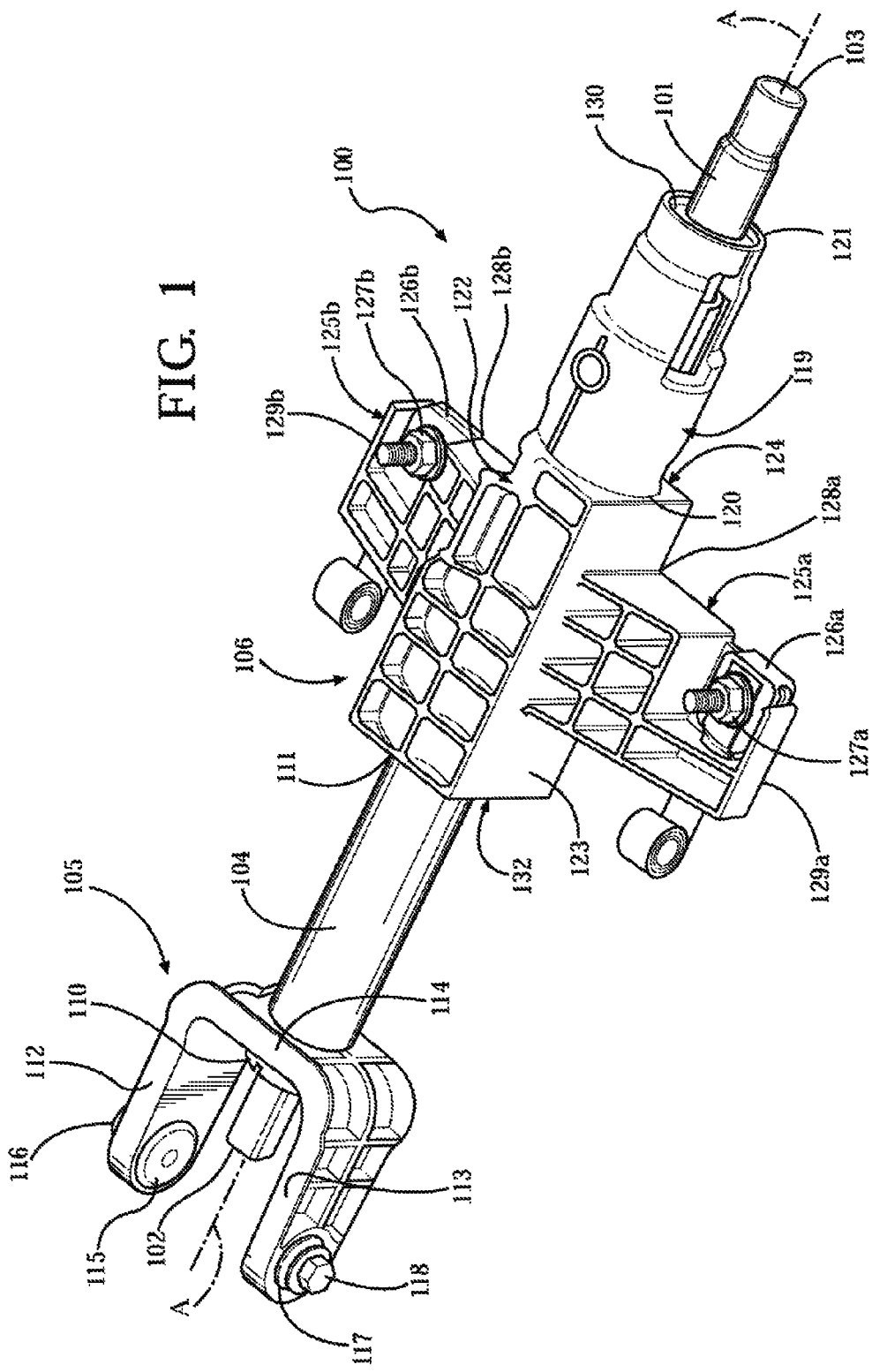
FIG. 1 is a schematic perspective view of the proposed steering column assembly.
Figure 2:
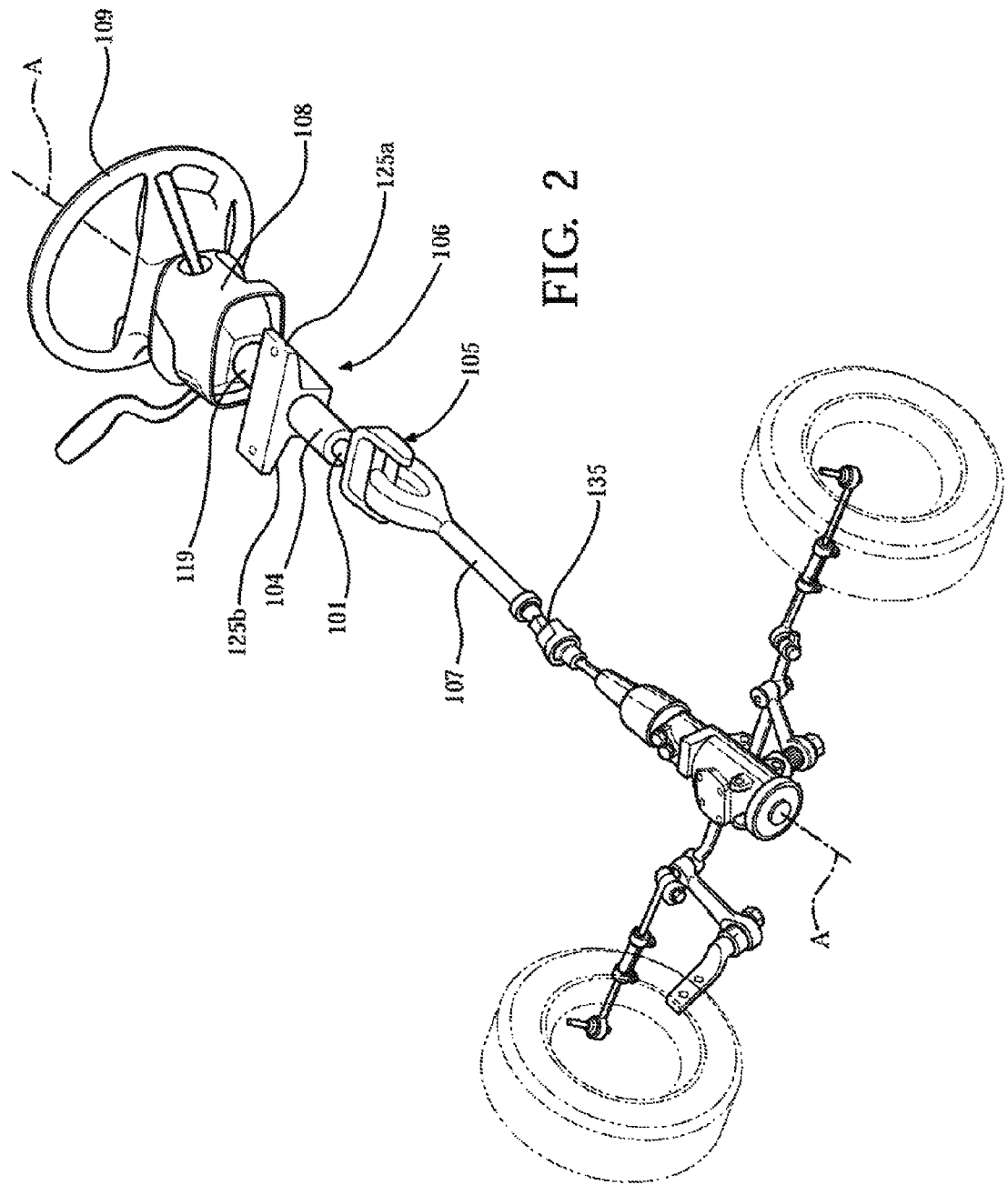
FIG. 2 is a schematic perspective view of the proposed steering column assembly coupled with the steering linkage and gear assembly as well as the tail or energy shaft at the main steering column shaft first end and the steering wheel and steering column shroud at the main steering column shaft second end.

Referring generally to FIGS. 1 and 2, the steering column assembly 100 may include a main steering column shaft 101; a first tubular member 104; a first attachment feature 105; and a second attachment feature 106. The main steering column shaft 101 may be formed of a metallic material such as steel or the like. The main steering column shaft 101 may have a first end 102, which may be coupled to a tail or energy shaft 107. The main steering column shaft 101 may have a second end 103, which may be coupled with a steering column shroud 108 and a steering wheel 109. The steering column shroud 108 may include a steering column multi-function switch and ignition housing assembly therein.

Referring to FIG. 1, the first tubular member 104 may concentrically surround the main steering column shaft 101 and be positioned proximate the main steering column shaft first end 102. The first tubular member 104 may be formed of a metallic material such as steel or the like. The first tubular member 104 may have a first tubular member first end 110 and a first tubular member second end 111. The first tubular member 104 may couple the first attachment feature 105 and the second attachment feature 106. The first attachment feature 105 may be positioned proximate the first tubular member first end 110. The second attachment feature 106 may be positioned proximate the first tubular member second end 111.

The first attachment feature 105 may be injection molded about the first tubular member first end 110. The first attachment feature 105 may include a first opposing leg 112 and a second opposing leg 113, the first and second opposing legs 112, 113 may be coupled by an intermediate bight section 114.

The first opposing leg 112 may define a bore 115 therein for receiving a first fastening feature 116. The second opposing leg 113 may also define a bore 117 therein for receiving a second fastening feature 118. Each of the first fastening feature 116 and second fastening feature 118 may include a trunnion and washer or the like for securing the main steering column shaft 101 to the tail or energy shaft 107.

The first attachment feature 105 is formed of an injection moldable material and is injection molded about the first tubular member 104 at the first tubular member first end 110. Utilization of injection molding and injection moldable materials maintains performance while reducing the mass of the first attachment feature 105, as well as removes the complexity of the attachment welds necessary for the fitting of metallic components.

The first attachment feature 105 may be formed of any high-strength injection moldable material, which may have a long glass fiber component wherein the long glass fibers are chemically coupled to the material matrix and provide excellent strength, stiffness, and resistance. The injection moldable material may include a load glass fiber component present in the injection moldable material in an amount of from about 40 parts by volume to about 60 parts by volume based on 100 parts by volume of the injection moldable material. The high-strength injection moldable material may be a high-strength polymeric injection moldable material or the like.

In one example, the first attachment feature 105 is formed from nylon 6-6 including the load glass fiber component present in the nylon 6-6 in an amount of from about 40 part by volume to about 60 parts by volume based on 100 parts by volume of the nylon 6-6 material. Suitable nylon 6-6 materials are commercially available from SABIC Innovative Plastics of Pittsfield, Mass., under the trade names LNP Verton Compound RV00CESS and LNP Verton Compound RF-700-12 EM HS. Verton Compound RV00CESS exhibits the desired strength, stiffness, and resistance. Verton Compound RV00CESS exhibits a flexural modulus of 18020 MPa in accordance with the ASTM D 790 standard. Verton Compound RV00CESS exhibits a tensile modulus, 50 mm/min of 19650 MPa in accordance with the ASTM D 638 standard. Verton Compound RV00CESS exhibits an Izod Impact, unnotched 80*10*4+23° C. of 102 kJ/m$^2$, in accordance with the ISO 180/1U standard and an Izod Impact, notched 80*10*4+23° C. of 54 kJ/m$^2$, in accordance with the ISO 180/1A standard.

In another example, the first attachment feature 105 is formed from polypropylene including the load glass fiber component present in the polypropylene in an amount of from about 40 parts by volume to about 60 parts by volume based on 100 parts by volume of the polypropylene material. Suitable polypropylene materials are commercially available from Borealis Compounds, Inc. of Port Murray, N.J. under the trade name Nepol™ GB402HP.

The second attachment feature 106 may be fitted about the first tubular member second end 111. The second attachment feature 106 may include a mounting section 122 and a tubular mast jacket section 119. The mounting section 122 may include a central portion 123 having a central portion first end 132 and a central portion second end 124. The central portion 123 may define a bore therein (not shown) extending along a longitudinal axis A from the central portion first end 132 to the central portion second end 124. The central bore (not shown) may be configured to receive the main steering column shaft 101 and the first tubular member 104.

The mounting section 122 may also include a first opposing wing portion 125a and second opposing wing portion 125b. Each of the respective first opposing wing portion 125a and second opposing wing portion 125b may have a proximal end 128a, 128b and a distal end 129a, 129b. The first opposing wing portion 125a and second opposing wing portion 125b may extend outwardly from the central portion 123 from proximal end 128a, 128b to distal end 129a, 129b.

Each of the respective first opposing wing portion 125a and second opposing wing portion 125b may be configured to secure the mounting portion 122 to the body of a vehicle. Each of the respective first opposing wing portion 125a and second opposing wing portion 125b may include a fastening platform 126a, 126b at its distal end 129a, 129b. Each of the respective fastening platforms 126a, 126b may be formed of a metallic material and may define a bore (not shown) therein for receiving at least one fastening feature 127a, 127b such as a nut and bolt or the like. Each of the respective fastening features 127a, 127b may be configured to secure the steering column assembly 100 to a vehicle.

The second attachment feature 106 may also include a tubular mast jacket section 119. The tubular mast jacket section 119 may have a tubular mast jacket first end 120 and a tubular mast jacket second end 121. The tubular mast jacket section 119 and the mounting section 122 are integrally molded as a single unitary piece. The tubular mast jacket section 119 and the mounting section 122 are integrally coupled at the central portion second end 124 and the tubular mast jacket first end 120. The tubular mast jacket 119 may define a central bore 130 therein for retaining the main steering column shaft 101. The central bore 130 is defined by the tubular mast jacket 119 and extends along the longitudinal axis A from the tubular mast jacket first end 120 to the tubular mast jacket second end 121.

The second attachment feature 106 is formed of an injection moldable material and is injection molded about the main steering column shaft 101. The second attachment feature 106, may be positioned intermediately between the main steering column shaft first end 102 and the main steering column shaft second end 103. Utilization of injection molding and injection moldable materials maintains performance while reducing the mass of the second attachment feature 106 as well as removes the complexity of the attachment welds necessary for the fitting of metallic components.

The second attachment feature 106 may be formed of any high-strength injection moldable material. The injection moldable material may include a load glass fiber component present in the injection moldable material in an amount of from about 40 parts by volume to about 60 parts by volume based on 100 parts by volume of the injection moldable material. The high-strength injection moldable material may be a high-strength polymeric injection moldable material or the like.

In one example, the second attachment feature 106 is formed from nylon 6-6 including the load glass fiber component present in the nylon 6-6 in an amount of from about 40 part by volume to about 60 parts by volume based on 100 parts by volume of the nylon 6-6 material. Suitable nylon 6-6 materials are commercially available from SABIC Innovative Plastics of Pittsfield, Mass., under the trade names LNP Verton Compound RV00CESS and LNP Verton Compound RF-700-12 EM HS. Verton Compound RV00CESS exhibits the desired strength, stiffness, and resistance. Verton Compound RV00CESS exhibits a a flexural modulus of 18020

MPa in accordance with the ASTM D 790 standard. Verton Compound RV00CESS exhibits a a tensile modulus, 50 mm/min of 19650 MPa in accordance with the ASTM D 638 standard. Verton Compound RV00CESS exhibits an Izod Impact, unnotched 80*10*4+23° C. of 102 kJ/m$^2$, in accordance with the ISO 180/1U standard and an Izod Impact, notched 80*10*4+23° C. of 54 kJ/m$^2$, in accordance with the ISO 180/1A standard.

In another example, the second attachment feature 106 is formed from polypropylene including the load glass fiber component present in the polypropylene in an amount of from about 40 parts by volume to about 60 parts by volume based on 100 parts by volume of the polypropylene material. Suitable polypropylene materials are commercially available from Borealis Compounds, Inc. of Port Murray, N.J. under the trade name Nepol™ GB402HP.

Referring to FIG. 2, the first attachment feature 105 may couple the main steering column shaft 101 with the stationary structure of the vehicle such as the tail or energy shaft 107 and steering linkage and gear assembly 135. The first attachment feature 105 may be constructed to provide pivotal movement about the fastening features 116, 118 (shown as trunnions) to enable tilting of the steering wheel 109.

The second attachment feature 106 may secure the steering column assembly 100 to a vehicle. The second attachment feature 106 is positioned intermediately between the main steering column shaft first end 102 and the main steering column shaft second end 103.

The steering column assembly 100 may also be coupled to the steering column shroud 108 proximate the main steering column shaft second end 103 and the tubular mast jacket second end 121, of the tubular mast jacket section 119 of the second attachment feature 106.

Figure 3:
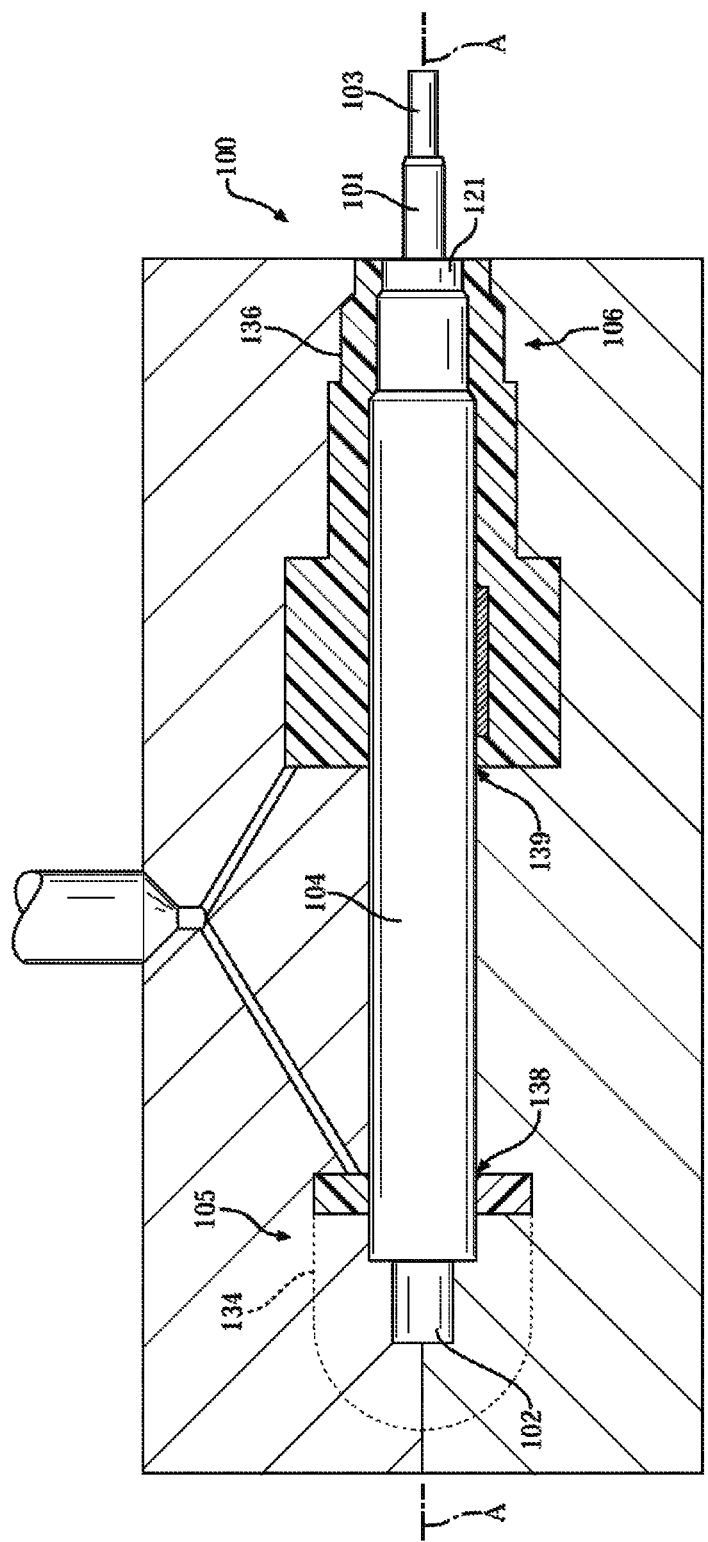
FIG. 3 is a schematic cross-sectional view of the main steering column shaft and first tubular member placed within the first mold with a mold cavity configured to define a first attachment feature proximate the main steering column shaft first end and the main steering column shaft and first tubular member placed within the second mold with a mold cavity configured to define a second attachment feature intermediately between the main steering column shaft first and main steering column shaft second end.

Referring to FIG. 3, a method of constructing a steering column assembly for a motor vehicle is also provided. The method comprises the steps of: fitting a first tubular member 104 about a main steering column shaft 101 having a main steering column shaft first end 102 and a main steering column shaft second end 103 and positioning the first tubular member 104 between the main steering column shaft first end 102 and the main steering column second end 103; positioning the main steering column shaft 101 and first tubular member 104 within a first mold 134 with a mold cavity 138 configured to define a first attachment feature 105, positioned at the main steering column shaft first end 102 and positioning the main steering column shaft 101 and first tubular member 104 within a second mold 136 with a mold cavity 139 configured to define a second attachment feature 106, positioned intermediately between the main steering column shaft first end 102 and the main steering column shaft second end 103; injecting a high-strength injection moldable material into the first mold 134 and the second mold 136; and molding the high-strength injection moldable material to form the first attachment feature 105 and second attachment feature 106 about the main steering column shaft 101 and first tubular member 104.

The high-strength material injection molded by the claimed method, by way of example, may be a polymeric injection moldable material such as nylon, polypropylene, or the like. The injection moldable material may have a load glass fiber component. In one example case, wherein the injection moldable material is nylon 6-6, the high-strength polymeric material may exhibit a drying temperature of from about 70° C. to about 90° C.; a drying time of about 3 hours to about 5 hours; a maximum moisture content from about 0.10% to about 0.30%; and a melt temperature from about 270° C. to about 320° C. Additionally the nylon 6-6 material may be injected with a back pressure of from about 0.15 MPa to about 0.45 MPa and a screw speed of from about 25 rpm to about 65 rpm, and molded at a temperature from about 90° C. to about 120° C.

Utilization of high-strength polymeric materials to form the first attachment feature 105 and second attachment feature 106 maintains performance of the steering column assembly 100, while reducing the overall mass of the steering column assembly 100 by up to 20%, relative to conventional steering columns formed with metallic components. Consequently, a reduction in weight of vehicle parts allows for a weight reduction in the vehicle as a whole, thereby maximizing fuel economy. The use of injection molding techniques to form and position the first attachment feature 105 and the second attachment feature 106 improves efficiency in assembly by removing the complexity of the attachment welds necessary for the forming and fitting of conventional metallic components.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A steering column assembly for a motor vehicle comprising:
   a main steering column shaft having a main steering column shaft first end and a main steering column shaft second end;
   a first tubular member configured to concentrically surround the main steering column shaft proximate the main steering column shaft first end;
   a first attachment feature formed of an injection moldable material and positioned about the first tubular member proximate the main steering column shaft first end; and
   a second attachment feature formed of an injection moldable material having a center portion defining a central bore extending longitudinally through the center portion, the central bore configured to receive the main steering column shaft, the second attachment feature positioned about the main steering column shaft intermediately between the main steering column shaft first end and the main steering column shaft second end, the second attachment feature configured to mount the main steering column shaft to the vehicle.

2. The steering column assembly of claim 1 wherein the second attachment feature further includes:
   a mounting section including the center portion, a first opposing wing, and a second opposing wing, the first opposing wing and second opposing wing extending outwardly from the center portion;
   a tubular mast jacket section defining a central bore extending longitudinally through the tubular mast jacket section, the central bore configured to receive the main steering column shaft; and
   wherein the mounting section and the tubular mast jacket section of the second attachment feature are integrally formed as a single unitary piece.

3. The steering column assembly of claim 1 wherein each of the first attachment feature and second attachment feature are formed of a polymeric injection moldable material.

4. The steering column assembly of claim 1 wherein each of the respective first attachment feature and second attachment feature are formed of an injection moldable material having a load glass fiber component present in the injection moldable material in an amount of from about 40 parts by volume to about 60 parts by volume based on 100 parts by volume of the injection moldable material.

5. The steering column assembly of claim 4 wherein the injection moldable material is nylon 6-6.

6. The steering column assembly of claim 5 wherein the nylon 6-6 material has a load glass fiber component of 60 parts by volume, based on 100 parts by volume, of the nylon 6-6 material.

7. The steering column assembly of claim 4 wherein the injection moldable material is polypropylene.

8. A method of constructing a steering column assembly for a motor vehicle, comprising the steps of:

fitting a first tubular member about a main steering column shaft having a main steering column shaft first end and a main steering column shaft second end and positioning the first tubular member proximate the main steering column shaft first end;

positioning the main steering column shaft and first tubular member within a first mold with a mold cavity configured to define a first attachment feature, positioned at the main steering column shaft first end and positioning the main steering column shaft and first tubular member within a second mold with a mold cavity configured to define a second attachment feature, positioned intermediately between the main steering column shaft first end and the main steering column shaft second end;

injecting a high-strength injection moldable material into the first mold and the second mold; and molding the high-strength injection moldable material to form the first attachment feature and second attachment feature about the main steering shaft and first tubular member.

9. The method of claim 8 wherein the high-strength injection moldable material is a high-strength polymeric material.

10. The method of claim 8 wherein the high-strength injection moldable material has a load glass fiber component present in the high-strength injection moldable material in an amount of from about 40 parts by volume to about 60 parts by volume based on 100 parts by volume of the high-strength injection moldable material.

11. The method of claim 10 wherein the high-strength injection moldable material is nylon 6-6.

12. The method of claim 11 wherein the nylon 6-6 material includes a load glass fiber component of 60 parts by volume, based on 100 parts by volume, of the nylon 6-6 material.

13. The method of claim 10 wherein the high-strength injection moldable material is polypropylene.

14. The method of claim 9 wherein the high-strength polymeric material is molded at a temperature from about 95° C. to about 110° C.

\* \* \* \* \*